United States Patent [19]
McGregor et al.

[11] 3,920,145
[45] Nov. 18, 1975

[54] ANTI-SIPHONING DEVICE FOR FLUID CONTAINERS

[75] Inventors: John D. McGregor, Baton Rouge; Sterling M. Boldreaux, New Orleans, both of La.

[73] Assignee: Stone Manufacturing, Inc., Baton Rouge, La.

[22] Filed: Feb. 20, 1974

[21] Appl. No.: 444,064

[52] U.S. Cl. .............. 220/86 AT; 85/3 S; 138/89; 138/103; 220/233
[51] Int. Cl.². B67C 3/00; F16B 35/00; F16B 21/02
[58] Field of Search ............ 220/86 AT, 86 R, 24.5, 220/233, 253; 85/3 R, 3 K, 3 S; 138/89, 103

[56] References Cited
UNITED STATES PATENTS

| 487,327 | 12/1892 | Hopkins | 220/24.5 |
|---|---|---|---|
| 945,188 | 1/1910 | Nichols | 85/3 S |
| 1,153,797 | 9/1915 | Kegreisz | 85/3 S |
| 1,939,983 | 12/1933 | Karitzky | 85/3 S |
| 2,024,871 | 12/1935 | Parsons | 85/3 K |
| 2,061,634 | 11/1936 | Pleister | 85/3 S |
| 2,371,241 | 3/1945 | Jaffa | 220/86 AT |
| 2,897,694 | 8/1959 | Carney | 85/3 S |
| 3,361,287 | 1/1968 | Clemons et al. | 220/24.5 |
| 3,513,746 | 5/1970 | Forsberg | 85/3 R |

FOREIGN PATENTS OR APPLICATIONS

| 280,142 | 1/1914 | Germany | 85/71 |

*Primary Examiner*—William I. Price
*Assistant Examiner*—Allan N. Shoap
*Attorney, Agent, or Firm*—Neil F. Markva

[57] ABSTRACT

A device that prevents the siphoning of liquid from a fluid container having a tubular inlet passage. A threaded elongated bolt has a head at one end and an alignment means including a nut located at the other end thereof. An expandable holding means is disposed on the threaded bolt between the head and the nut. Biasing means expands the holding means outwardly with respect to the longitudinal axis of the threaded bolt so that the holding means frictionally engages the inner surface of the tubular inlet passage. The alignment means disposed on the end of the threaded bolt opposite the head end guides the device into position within the inlet passage. An expandable space filling means is disposed on the threaded bolt to prevent the passage of the tube beyond the device into the fluid container.

30 Claims, 15 Drawing Figures

_Fig. 9_

_Fig. 11_

_Fig. 10_

_Fig. 12_

ANTI-SIPHONING DEVICE FOR FLUID CONTAINERS

BACKGROUND OF THE INVENTION

The invention relates to an anti-siphoning device for fluid containers. There are many devices which are designed to prevent theft or siphoning of fluid from fluid containers such as gasoline tanks. Most of the prior art devices, however, are either very complicated, require a key which might be lost or operate purely upon the basis of spring biasing action. Basic disadvantages such as high production cost, complexity of installation, high probability of being bypassed or disengaged from an operative position are all associated with the known prior art devices. In addition, the prior art devices are limited in use to a particular size of passageway leading into a container.

PURPOSE OF THE INVENTION

The primary object of the invention is to provide a device which will prevent the siphoning or theft of liquids from containers having inlet passageways with different sizes and constrictions.

Another object of the invention is to provide a device that may be permanently installed into the inlet passageway to a container at a location spaced from the outlet opening of the passageway.

A further object of the invention is to provide an anti-theft device which may be installed in inlet passageways for containers which may be incorporated in either a gravity feed or vacuum feed type system.

Another object of the invention is to provide an anti-siphoning device which overcomes the basic disadvantages associated with known devices of this type.

SUMMARY OF THE INVENTION

These objects and other advantages are accomplished by the construction of a device as disclosed and described herein. The device comprises a threaded elongated bolt member having a head at one end thereof and a tightening means. Expandable holding means are disposed on the threaded bolt and the tightening means is effective to move the holding means along the bolt member. Biasing means expands the holding means outwardly with respect to the longitudinal axis of the threaded bolt. Thus the holding means are maintained in frictional contact with the inside surface of the inlet passageway for the fluid container. This enables the device to be maintained within the inlet passageway as it is being pushed into position at a location spaced away from the cap outlet opening of the inlet passage.

The major importance of the device is the use of a mechanical force that will permanently hold the device into a fixed position within the inlet passageway. This mechanical force is finally effected by tightening the bolt to a bottomed out condition with respect to the holding means. Until then, a longitudinal force caused by a coil spring disposed around the bolt member is converted to an axial force by the holding means. Once the bolt is tightened to a predetermined amount, the longitudinal force caused by the tightening of the bolt is transmitted axially by the expandable holding means. The initial spring loaded force keeps the holding means from turning within the tube or passageway while the bolt is being turned into the tightening means.

Another feature of the invention is directed to the use of an alignment means which holds the bolt in a centrally disposed location with respect to the inside walls of the inlet passageway. The inlet passageway may be constricted along one side thereof by a baffle construction. In this event, an alignment plate is partially flattened off along one chord thereof to enable the device to be passed beyond the constriction within the inlet passage. Openings are located in any shape or form in the alignment disc to provide for free flow of liquid into the tank container. In another embodiment, two nuts are laterally spaced with respect to each other and a disc member is loosely disposed on the bolt member between the nuts. The tilting of the disc member allows the device to bypass any constriction found in the passageway.

A further feature of the invention is directed to the use of a space filling mechanism that is needed when the inlet passageway has a lipped configuration at the outlet opening thereof. That is, once the device is placed in such an inlet passage, there is the possibility that a tube may be inserted into the tank container within the space created between the inside of the container and the alignment means due to the lipped configuration. The space filling mechanism is designed to be in a contracted position while the device is being installed in the inlet passageway. Once in position, the tightening of the threaded bolt to a bottomed out position will cause the space filling mechanism to expand under the influence of the mechanical force thus further constricting the inlet passage from being bypassed by a siphoning tube.

A still further feature of this invention is that the device may incorporate a commerically available toggle bolt structure which is adapted in accordance with this invention with a further biasing and alignment means for effecting the desired results.

BRIEF DESCRIPTION OF DRAWINGS

Other objects of this invention will appear in the following description and appended claims, reference being made to the accompanying drawings forming a part of the corresponding parts in the several views.

DESCRIPTION OF SPECIFIC EMBODIMENTS

More specifically, referring to the drawings, the antisiphoning device, generally designated 10, comprises a bolt 11 having a head 12 disposed at one end thereof. The head 12 includes a slot 12a which is beveled off along two opposing sides of the head 12 so that the bolt 11 constitutes a non-reversible, one-way screwing mechanism. This is a conventional technique.

An alignment means is disposed at the other end of the bolt 11 and includes nuts 13 which fixedly secure the alignment plate 14 therebetween via the washers 15. Lock washers or star washers may be used. The alignment plate 14 includes opening 14a to allow a free flow of liquid therethrough when the device 10 is disposed in a tubular inlet passageway.

Expandable holding means comprising wing members 16 are disposed on the threaded bolt 11. A thin nut 16b constitutes tightening means for effecting movement of the wing members 16 along the bolt 11. The wing members 16 are outwardly biased by a spring member 16a so that the members 16 are movable between an expanded position and a retracted position. Wing members 16 are effective to maintain a frictional contact between the device 10 and the inside walls of the inlet passageway so that the device 10 may be placed in the inlet passageway without falling directly into the fluid container.

Biasing means including the spring 16a, coil or helical spring 17 and expander plate 18 cooperate to expand the wing members 16 outwardly with respect to the longitudinal axis of the threaded bolt 11. The helical spring 17 is disposed around and extends longitudinally along the bolt member 11. Spring 17 exerts a force against the expander plate 18 which, in turn, forces the wing members 16 outwardly. As shown, the expander element is contiguous to the wing members 16.

In this specific embodiment, the wing members 16 are the expanding element of a commercially available toggle bolt. The wing members 16 swing outwardly in a direction away from the head 12 of the threaded bolt 11. It is contemplated that the wing members 16 may be turned around to swing outwardly in a direction away from the nuts 13. Here the biasing means is disposed between the nuts 13 and the wing members 16.

Figure 1:
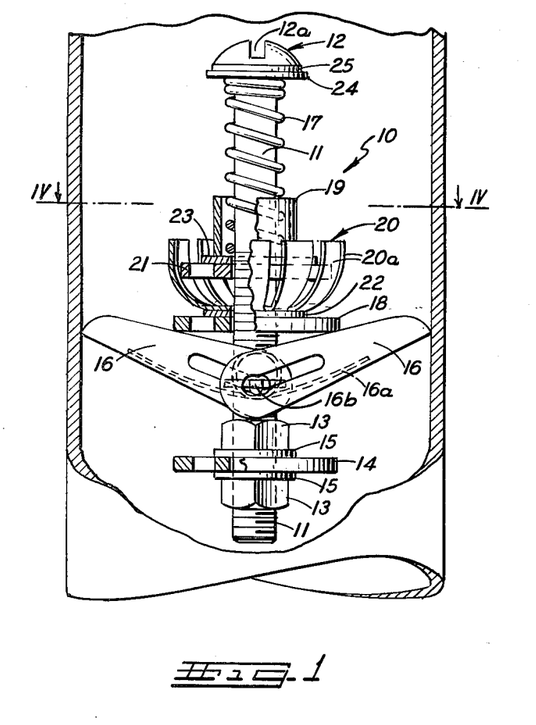
FIG. 1 is a side elevational view showing a device made in accordance with this invention in an extended position.
Figure 2:
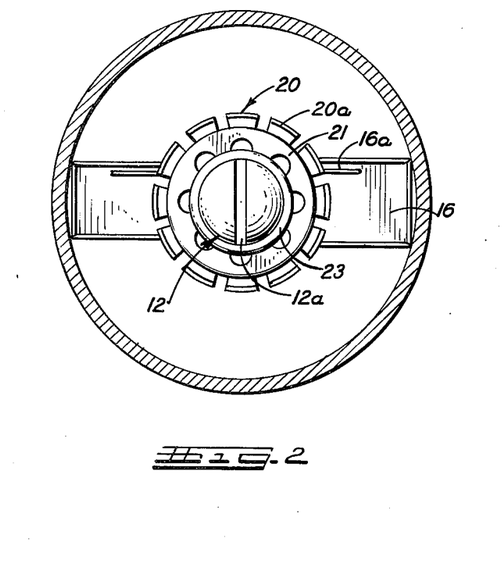
FIG. 2 is a top plan view of the device of FIG. 1.
Figure 3:
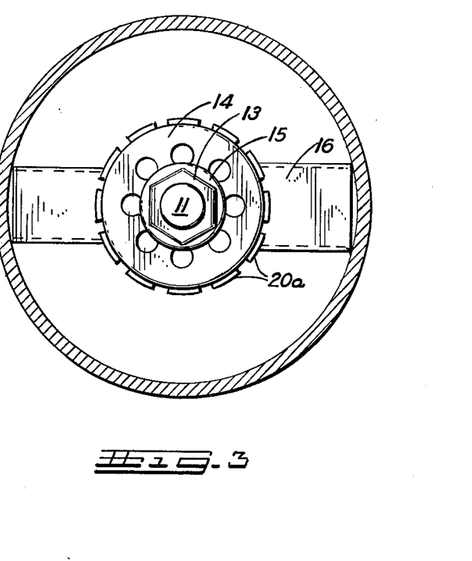
FIG. 3 is a bottom plan view of the device of FIG. 1.

Another feature of the invention is directed to the expanding space filling mechanism generally designated 20. A plurality of outwardly expanding fin or blade members 20a project radially from a center portion (not numbered) disposed around the bolt 11. The space filling mechanism 20 is in a floating relationship with respect to the bolt 11 and thus is biased in a direction toward the nut end of the bolt by the spring 17. A washer 22 is located between the space filling mechanism 20 and the expander plate 18 to prevent constriction of the device by maintaining a spacing for fluid flow along the bolt 11. A second expanding plate 21 is located within the area formed by the inwardly turned blade members 20a as shown in FIG. 1. Another spacer washer 23 is disposed between the end of the coil spring 17 and the expander element 21. Further, spacer members 24 and 25 are located between the head 12 and the other end of the coil spring 17.

The tubular segment 19 is disposed around coil spring 17. The tubular segment 19 constitutes a spacer means that is effective to transfer the mechanical force provided by the tightening means or nut 16b to the wing members 16 via the expander elements 18 and 21. The spacer means 19 has a length that is effective to bottom out the threaded bolt 11 in the nut 16b without fully compressing the coil spring 17 which acts directly against the expander element 21 and indirectly against the expander element 18.

Figure 7:
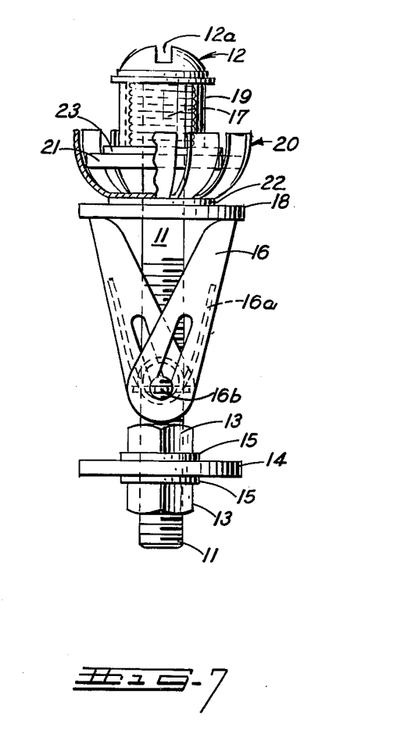
FIG. 7 is a side elevational view of the device of FIG. 1 shown in a retracted position.
Figure 8:
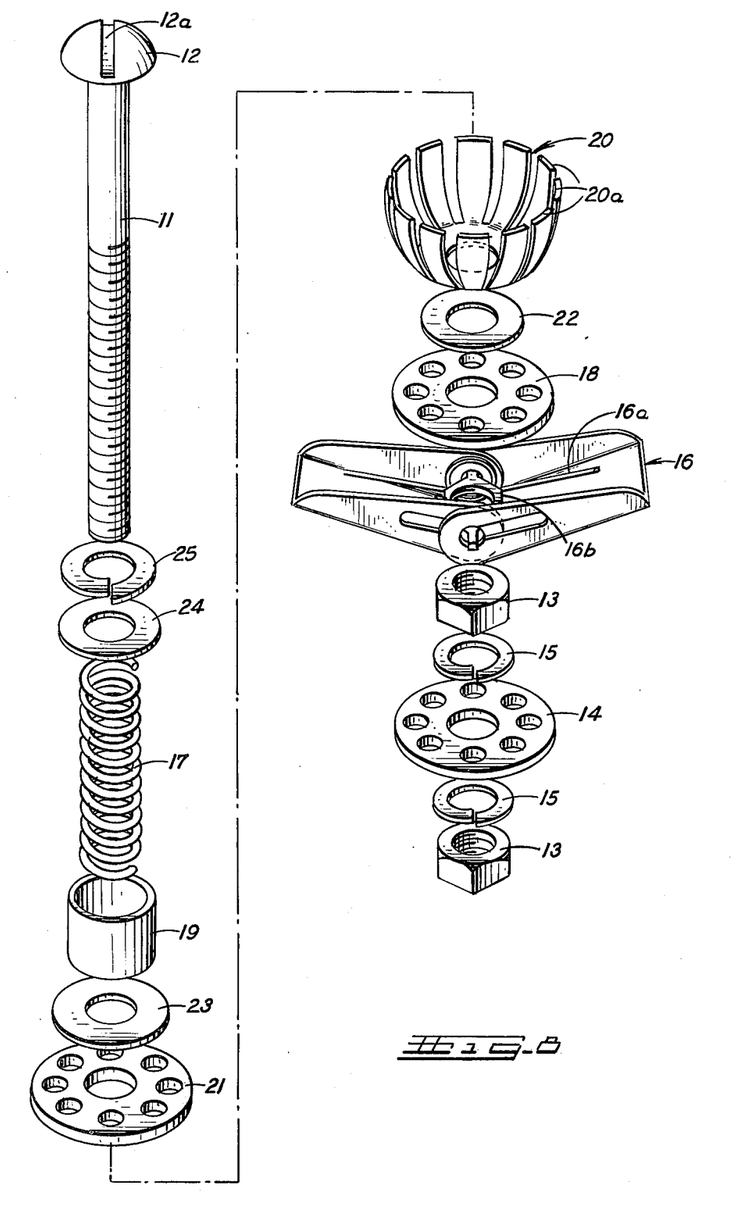
FIG. 8 is an exploded view of the device of FIG. 1.

In operation, the device as shown in FIGS. 1 through 8 first is placed in a retracted position as shown in FIG. 7 by squeezing with the operator's fingers. While in this elongated retracted position, the device is placed through the outlet opening of the inlet passageway. Once the wing members 16 are released, they swing outwardly away from the longitudinal axis of the bolt 11 and come into frictional contact with the inside surfaces of the inlet passageway. In other words, the wing members 16 are of such a length to extend into an operative frictional contact with the inner surface of the inlet passageway.

The members 16 are not in a fully extended position away from the bolt member 11. The spring member 16a causes an outward biasing on the wing members and the coil 17 acts indirectly on the expanded plate 18 to provide a longitudinal force that is transmitted to the inside walls of the passageway via the axially disposed wing members 16. The alignment plate 14 acts as a guide for the device 10 as it is placed into its proper position. As stated, the springs 17 and 16a keep enough force on the toggle wing members 16 against the inside walls of the passageway to make positioning therein very easy.

Once in position, a screwdriver is placed in the non-reversible slot 12a and the threaded bolt 11 is tightened into nut 16b. That is, the toggle wing member 16 will move closer to the head 12 thereby bringing the spacer 19 into contact with the spacer washer 23. The length of the tubular segment 19 is effective to bottom out the threaded bolt 11 in the nut 16b without fully compressing the coil springs 17. Thus a spring loaded force acts indirectly on the first expander element 18 that is contiguous to the wing members 16 and directly against the second expander element 21.

Figures 4, 5, 6:
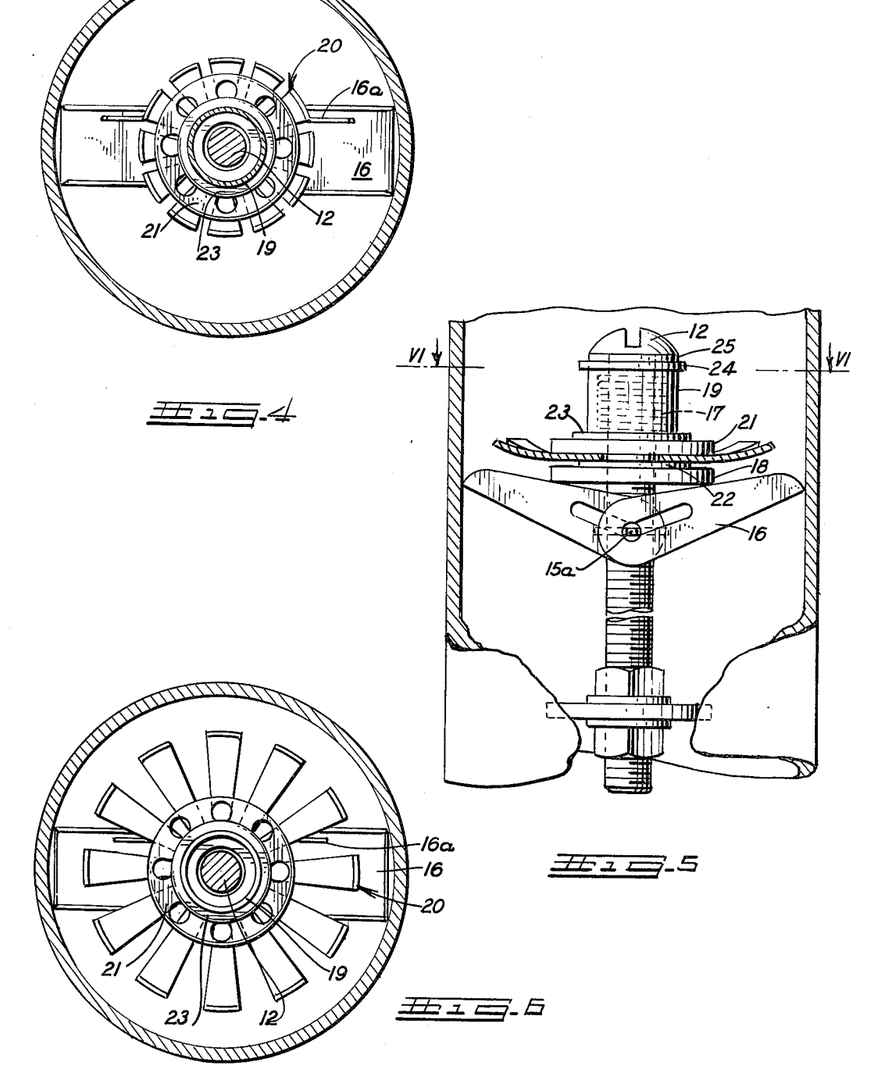
FIG. 4 is a cross-sectional view taken along line IV—IV of FIG. 1.
FIG. 5 is an elevational view of the device of FIG. 1 in a further operative position.
FIG. 6 is a cross-sectional view taken along line VI—VI of FIG. 5.

When the distance between the washer 24 and washer 23 is completely enclosed by the tubular segment 19, the continued tightening of the threaded bolt 11 causes the expander plate or element to move mechanically against the fin or blade members 20a shown in a contracted position in FIG. 1. When the bolt 11 is finally bottomed out, the blade members 20a are in an outwardly radiating or expanded position as shown in FIGS. 5 and 6 thereby filling the space between the bolt 11 and the inside of the passageway. In this bottomed out position, the mechanical force effected through the tubular segment or spacer 19 overrides the spring biasing force caused by springs 16a and 17. The expander plates or elements 18 and 21 also provide the function of support to the outwardly expanded space filling means 20 once it is in the position shown in FIG. 6. The tubular segment 19 disposed around the springs 17 also protects the spring from being destroyed by anyone who wished to tamper with the device.

Figure 9:
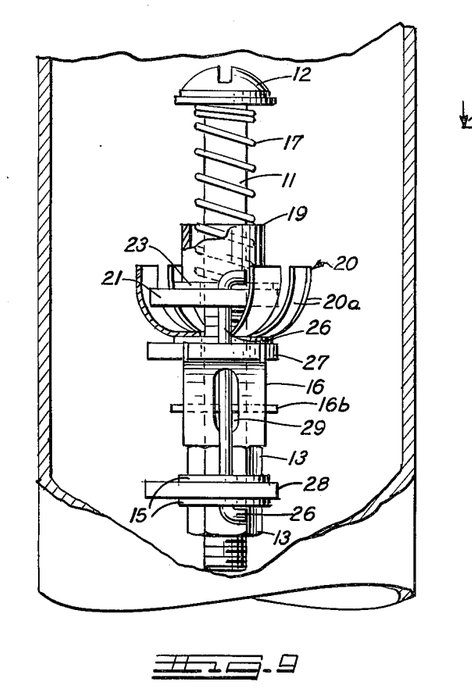
FIG. 9 is an elevational view showing another embodiment of a device made in accordance with this invention.
Figure 10:
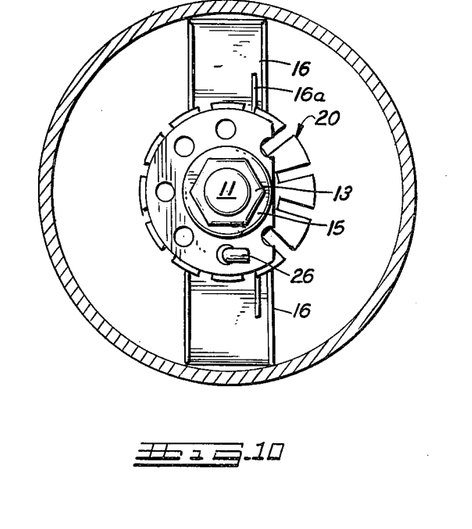
FIG. 10 is a bottom plan view of the embodiment shown in FIG. 9.

The embodiment as shown in FIGS. 9 and 10 includes a pin configuration 26 extending between the holes in the expander plates 21 and 27 and a slot 29 located in the wing members 16. Pin 26 simply holds the alignment of the parts fixed with respect to the position of the flat side of the alignment plate 28. Thus, this embodiment may be placed into a partially constricted inlet passage such as found on many gasoline tanks. The toggle wing member 16 is slotted so that it can expand outwardly while the pin member 26 is in place.

Figure 11:
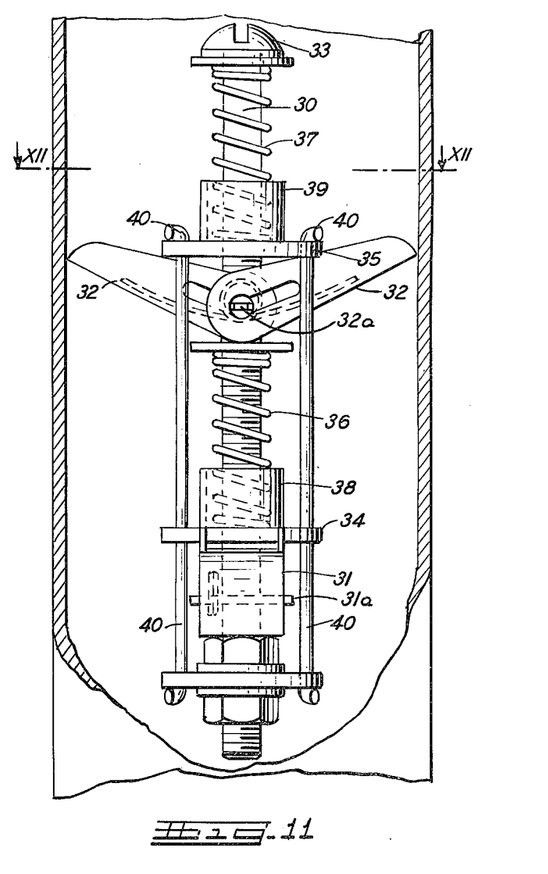
FIG. 11 is an elevational view of a further embodiment of a device made in accordance with this invention.
Figure 12:
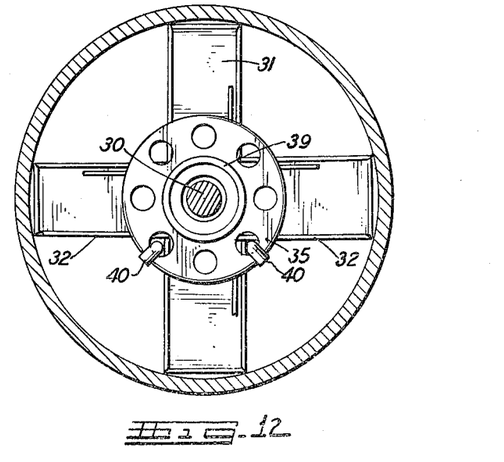
FIG. 12 is a cross-sectional view taken along line XII—XII of FIG. 11.

A further embodiment of the invention is shown in FIG. 11. Here the bolt member 30 carries two sets of toggle wing members 31 and 32. The first set of toggle wing members 31 is at one location and the second set of toggle wing members 32 is disposed at another location between the first set of toggles 31 and the head 33 of the threaded bolt 30. Expander plates 34 and 35 act against the separate sets of toggle wing members 31 and 33, respectively. Coil springs 36 and 37 act directly on the expander elements 34 and 35, respectively. Spacer elements 38 and 39 function in the same way as the embodiments discussed hereinabove. Alignment pins 40 extend between the expander plates 34 and 35 to maintain the transverse positioning of the sets of toggle wing members 31 and 32 with respect to each other while the bolt 30 is being tightened. Thus, a mechanical force is brought to bear on the inside surface of the inlet passage via the toggle wing members 31 and 32.

It is also within the contemplation of this invention that other forms of toggle wing members may be used. For example, there are commercially available toggle wing configurations having more than two members disposed radially around the threaded bolt.

Figure 13:
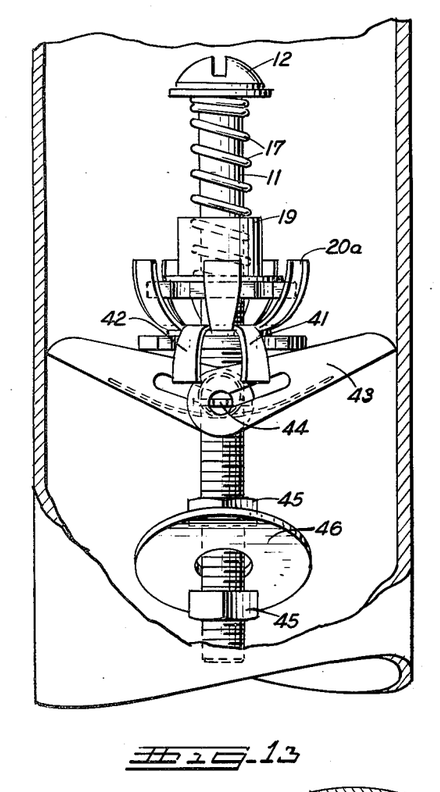
FIG. 13 is an elevational view of a still further embodiment of a device made in accordance with this invention.
Figure 14:
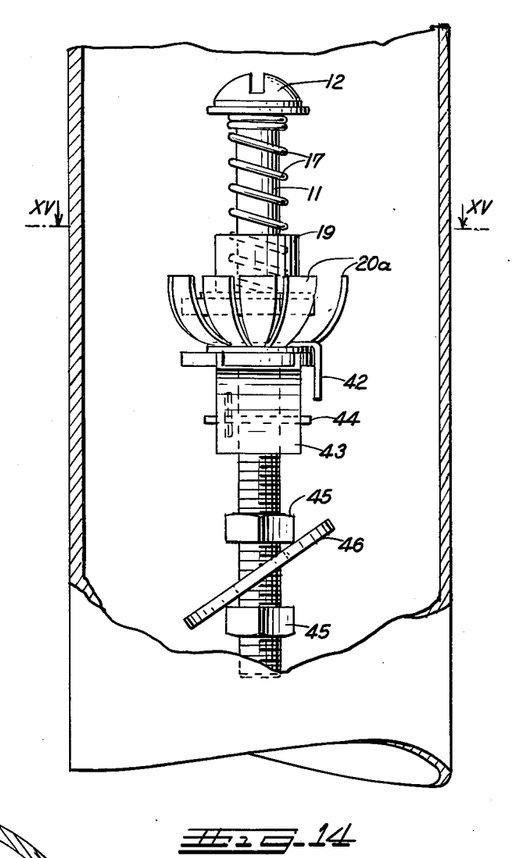
FIG. 14 is an elevational view turned 90° from the position shown in FIG. 13.
Figure 15:
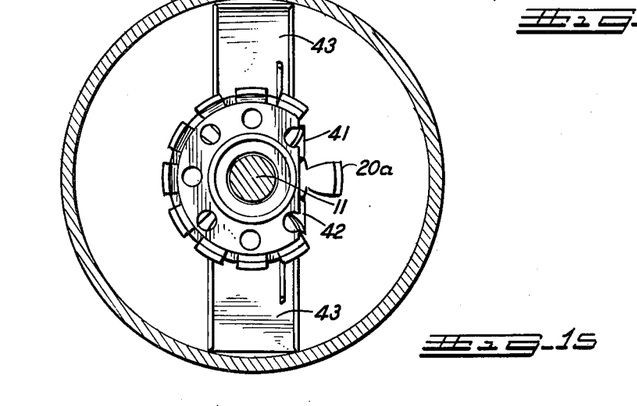
FIG. 15 is a cross-sectional view taken along line XV—XV of FIG. 14.

In the embodiment shown in FIGS. 13 – 15, the wing members 43 are held in a generally fixed radial position with respect to the bolt member 11 by at least two of the bendable fin members 20a of the space filling means. As shown, fin members 41 and 42 are bent to an alignment holding position. Consequently, the radial position of the expandable holding members 43 with respect to the bolt member 11 is maintained. That is, as the bolt member 11 is tightened into the bolt 44, the holding members 43 will not turn but stay in their expanded, frictional holding position against the inner surface of the inlet passageway.

Another feature of this embodiment is directed to another alignment means. The two lock bolts 45 are laterally spaced with respect to each other by an amount sufficient to allow the washer or disc member 46 to fit loosely therebetween as shown. Thus, when there is a partially constricted inlet passageway, the disc member 46 will naturally tilt itself obliquely so that the device will be able to pass by the constriction.

While the anti-siphoning device for fluid containers has been shown and described in detail, it is obvious that this invention is not to be considered as being limited to the exact form disclosed, and that changes in detail and construction may be made therein within the scope of the invention, without departing from the spirit thereof.

The embodiments of the invention in which an exclusive property or privilege is claimed are defined as follows:

1. A device for preventing the siphoning of liquid from a fluid container having a tubular inlet pasageway, said device comprising:
   a. a threaded elongated bolt member having a head at one end thereof,
   b. expandable holding means disposed on the threaded bolt,
   c. tightening means for effecting movement of the holding means along the bolt member,
   d. spring-loaded biasing means for expanding the holding means outwardly with respect to the longitudinal axis of the threaded bolt,
   e. spacer means disposed on the bolt member for providing a mechanical force which will override the spring-loaded biasing means after the device is disposed within the inlet passageway,
   f. alignment means disposed on the end of the threaded bolt opposite said head end for guiding the device into position within the inlet passage.

2. A device as defined in claim 1 wherein
said expandable holding means includes a plurality of outwardly biased wing members that are movable between an expanded position and a retracted position,
said wing members being effective to maintain a frictional contact between the device and the inside walls of the inlet passageway so that the device may be placed in the inlet passageway without falling directly into the fluid container.

3. A device as defined in claim 1 wherein
said expandable holding means includes the wing members of a toggle bolt,
said biasing means includes the spring member of said toggle bolt.

4. A device as defined in claim 2 wherein
said wing members swing outwardly in a direction away from the head end of the threaded bolt.

5. A device as defined in claim 1 wherein
said spring-loaded biasing means includes a helical spring longitudinally disposed around the bolt member and being effective to cause a force to be exerted against the holding means.

6. A device as defined in claim 1 wherein
said spring-loaded biasing means includes an expander element and a coil spring longitudinally disposed around the threaded bolt,
said expander element being disposed between the coil spring and the holding means,
said coil spring being effective to produce a force against the holding means via said expander element.

7. A device as defined in claim 1 wherein
said spring-loaded biasing means includes an expander element contiguous to said holding means and a coil spring,
said spacer means being effective to transfer the mechanical force provided by said tightening means to the holding means via the expander element.

8. A device as defined in claim 7 wherein
the coil spring and the spacer means are disposed between the head and the expander element.

9. A device as defined in claim 7 wherein
the spacer means comprises a tubular segment that is disposed around the coil spring located on the bolt.

10. A device as defined in claim 7 wherein
the spacer means has a length that is effective to bottom out the threaded bolt means in the tightening means without fully compressing the coil spring acting against the expander element.

11. A device as defined in claim 1 wherein
said alignment means comprises a disc member disposed between two nuts that are located at the end of the bolt member opposite the head.

12. A device as defined in claim 11 wherein
the nuts are laterally displaced with respect to each other by an amount sufficient to allow the disc member to fit loosely therebetween.

13. A device as defined in claim 1 wherein
said alignment means includes a pin member extending in a direction parallel to the longitudinal axis of the bolt member to maintain the holding means in alignment with respect to said bolt.

14. A device as defined in claim 1 wherein
an expandable space filling means is disposed on the threaded bolt, and
said biasing means includes an expander element acting on said space filling means to cause the space filling means to expand outwardly with respect to the longitudinal axis of the threaded bolt.

15. A device as defined in claim 1 wherein
said holding means includes two sets of wing members,
each set being disposed on the threaded bolt and extending in transverse directions with respect to each other.

16. A device as defined in claim 15 wherein
one of said sets is disposed between the head of the bolt and the other set of wing members.

17. A device as defined in claim 16 wherein
said biasing means includes a first coil spring and expander element disposed on one side of the floating set of wing members and a second coil spring and expander element disposed between the first and second set of coil members,
said spacer means including a tubular spacer element disposed around each spring and having a length effective to prevent complete compression of the spring when the threaded bolt is tightened.

18. A device for preventing the siphoning of liquid from a fluid container having a tubular inlet passage, said device comprising:
 a. a threaded elongated bolt member having a head at one end thereof,
 b. expandable holding means disposed on the threaded bolt,
 c. tightening means for effecting movement of the holding means along the bolt member,
 d. biasing means for expanding the holding means outwardly with respect to the longitudinal axis of the threaded bolt,
 e. said biasing means including an expander element having openings therein and being contiguous to said holding means, and
 f. alignment means disposed on the end of the threaded bolt opposite said head end for guiding the device into position within the inlet passage,
 g. said alignment means comprising a pin member and a disc member having an opening and being disposed between two nuts that are located at the end of the bolt member opposite the head,
 h. said pin member extending between the opening in the disc member and an opening located in said expander element.

19. A device for preventing the siphoning of liquid from a fluid container having a tubular inlet passage way, said device comprising:
 a. a threaded elongated bolt member having a head at one end thereof,
 b. expandable holding means disposed on a threaded bolt,
 c. tightening means for effecting movement of the holding means along the bolt member,
 d. biasing means for expanding the holding means outwardly with respect to the longitudinal axis of the threaded bolt,
 e. alignment means disposed on the end of the threaded bolt opposite said head end for guiding the device into position within the inlet passage, and
 f. an expandable space filling means being disposed on the threaded bolt,
 g. said biasing means including a first expander element contiguous to said holding means, a second expander element contiguous to said space filling means, and a coil spring which acts on said second expander element to bias the spring filling means toward the first expander element,
 h. said spacer means being effective to transfer the mechanical force provided by said tightening means to the holding means via the expander elements when the threaded bolt has bottomed out.

20. A device as defined in claim 19 where
said first expander element is located between the holding means and the space filling means,
said spacer means includes a washer located between the space filling means and the first expander element.

21. A device as defined in claim 19 wherein
the expandable space filling means includes a plurality of fin members being bendable between a contracted position and an expanded position.

22. A device as defined in claim 21 wherein
at least two of the fin members are bendable to an alignment holding position to maintain the radial position of the expandable holding means with respect to the bolt member.

23. A device for preventing the siphoning of a liquid from a fluid container having a tubular inlet passageway, said device comprising:
 a. an elongated member having a head at one end thereof,
 b. expandable holding means disposed on the elongated member,
 c. means for spring biasing the holding means outwardly with respect to the longitudinal axis of the elongated member and frictionally maintaining contact against the inside wall surface of said inlet passageway, and
 d. means providing a mechanical force to the holding means after said device is in place within the inlet passageway,
 e. said mechanical force providing means being effective to override the spring biasing means causing the holding means to be maintained in contact with said inside wall surface via a mechanical force.

24. A device as defined in claim 23 wherein
the elongated member comprises a threaded bolt and the holding means is adapted to be moved along the bolt member.

25. A device as defined in claim 23 wherein
the spring biasing means includes an expander element and a coil spring longitudinally disposed around the elongated member,
said expander element being disposed between the coil spring and the holding means,
said coil spring being effective to produce a spring biasing force against the holding means via said expander element.

26. A device as defined in claim 23 wherein
the spring biasing means includes an expander element contiguous to the holding means and a coil spring disposed around the elongated member,
said mechanical force providing means includes a spacer means,
the coil spring and the spacer means being disposed between the head and the expander element.
27. A device as defined in claim 26 wherein
the spacer means comprises a tubular segment that is disposed around the coil spring located on the bolt.
28. A device as defined in claim 23 wherein
the elongated member comprises a thread toggle bolt,
said expandable holding means includes the wing members of said toggle bolt,
said spring biasing means includes the spring member of said toggle bolt.
29. A device as defined in claim 28 wherein
said wing members swing outwardly in a direction away from the head end of the threaded toggle bolt.
30. A device as defined in claim 23 wherein
an expandable space filling means is disposed on the elongated member, and
said spring biasing means includes an expander element acting on said space filling means to cause the space filling means to expand outwardly with respect to the longitudinal axis of the threaded bolt.

* * * * *